(12) United States Patent
Tarascon et al.

(10) Patent No.: US 10,998,549 B2
(45) Date of Patent: May 4, 2021

(54) METHOD TO SYNTHESIZE NA-BASED ELECTROACTIVE MATERIALS

(71) Applicant: CENTRE NATIONAL DE LA RECHERCHE SCIENTIFIQUE (C.N.R.S.), Paris (FR)

(72) Inventors: Jean-Marie Tarascon, Paris (FR); Patrick Rozier, Toulouse (FR); Biao Zhang, Paris (FR); Romain Dugas, Paris (FR)

(73) Assignees: CENTRE NATIONAL DE LA RECHERCHE SCIENTIFIQUE, Paris (FR); UNIVERSITE TOULOUSE III—PAUL SABATIER, Toulouse (FR); SORBONNE UNIVERSITE, Paris (FR); COLLEGE DE FRANCE, Paris (FR)

(*) Notice: Subject to any disclaimer, the term of this patent is extended or adjusted under 35 U.S.C. 154(b) by 84 days.

(21) Appl. No.: 15/736,523

(22) PCT Filed: Jun. 15, 2016

(86) PCT No.: PCT/EP2016/063770
§ 371 (c)(1),
(2) Date: Dec. 14, 2017

(87) PCT Pub. No.: WO2016/202868
PCT Pub. Date: Dec. 22, 2016

(65) Prior Publication Data
US 2018/0190987 A1    Jul. 5, 2018

(30) Foreign Application Priority Data

Jun. 19, 2015 (EP) ..................... 15305956
Oct. 19, 2015 (EP) ..................... 15306674

(51) Int. Cl.
*H01M 4/58* (2010.01)
*B22F 9/00* (2006.01)
(Continued)

(52) U.S. Cl.
CPC ............ *H01M 4/5825* (2013.01); *B22F 9/04* (2013.01); *C01B 25/37* (2013.01); *C01B 25/455* (2013.01);
(Continued)

(58) Field of Classification Search
CPC .. H01B 1/00; H01B 1/02; H01M 4/58; H01M 4/5815; H01M 4/5825; B22F 1/0003;
(Continued)

(56) References Cited

U.S. PATENT DOCUMENTS 3,662,801 A * 5/1972 Schneider .............. C10H 13/00
149/5
2013/0069012 A1   3/2013  Kim et al.
(Continued)

FOREIGN PATENT DOCUMENTS

CN   103022490   4/2013
CN   103594716   2/2014

OTHER PUBLICATIONS

Ando et al "Mechanochemical synthesis of Na—Sb alloy negative electrodes . . .", The Electrochemical Society of Japan, Electrochemistry (in press) pub Aug. 24, 2019.*
(Continued)

*Primary Examiner* — Mark Kopec
(74) *Attorney, Agent, or Firm* — Troutman Pepper Hamilton Sanders LLP (57) ABSTRACT

The invention relates to a process for the preparation of sodium-based solid compounds, such as sodium-based solid alloys and sodium-based crystalline phases by ball-milling using metallic sodium as starting material.
(Continued)

The invention also relates to some sodium-based crystalline P'2-phases and to Na-based vanadium phosphates phases $(Na_{(3+y)}V_2(PO_4)_3)$ with $0<y\leq 3$ and Na-based vanadium fluorophosphates phases $(Na_{(3+z)}V_2(PO_4)_2F_3)$ with $0<z\leq 3$, in particular $Na_4V_2(PO_4)_2F_3$, obtained by such a process and to their use, as active material for positive electrode, in a Na-ion battery.

14 Claims, 8 Drawing Sheets

(51) Int. Cl.
| | |
|---|---|
| *C22C 1/04* | (2006.01) |
| *B22F 9/04* | (2006.01) |
| *C22C 24/00* | (2006.01) |
| *H01M 10/054* | (2010.01) |
| *H01M 4/505* | (2010.01) |
| *H01M 4/525* | (2010.01) |
| *H01M 4/587* | (2010.01) |
| *C01B 25/455* | (2006.01) |
| *C01B 25/37* | (2006.01) |
| *H01B 1/02* | (2006.01) |
| *C22C 1/10* | (2006.01) |

(52) U.S. Cl.
CPC .......... *C22C 1/0408* (2013.01); *C22C 1/1084* (2013.01); *C22C 24/00* (2013.01); *H01B 1/02* (2013.01); *H01M 4/505* (2013.01); *H01M 4/525* (2013.01); *H01M 4/587* (2013.01); *H01M 10/054* (2013.01); *B22F 2009/043* (2013.01); *B22F 2998/10* (2013.01)

(58) Field of Classification Search
CPC .. B22F 2201/00; B22F 2301/054; B22F 9/00; C22C 28/00; C22C 1/0408; C22C 49/04
See application file for complete search history.

(56) References Cited

U.S. PATENT DOCUMENTS

2018/0190990 A1\* 7/2018 Tarascon ............... H01M 4/505
2019/0181447 A1\* 6/2019 Tarascon ............... H01M 4/04

OTHER PUBLICATIONS

Zhang et al "Insertion compounds and composites made by ball milling for advanced sodium-ion batteries", Nature Communications, 7:103308, pub Jan. 18, 2016.\*
Naoki Yabuuchi et al. "P2-type Nax [Fel/2Mnl/2] 02 made from earth-abundant elements for rechargeable NA batteries," Nature Materials, vol. 11, No. 6; Apr. 29, 2012; pp. 1476-1122.
Larisa S. Plashnitsa et al.: Performance of Nasicon Symmetric Cell with Ionic Liquid Electrolyte, Journal of the Electrochemical Society, vol. 157, No. 4; Mar. 11, 2010; p. A536.
Shinichi Komaba et al: "Study on the Reversible Electrode Reaction of Na 1-x Ni 0.5 Mn 0.5 0 2 for rechargeable Sodium-Ion Battery", Inorganic Chemestry, vol. 51, No. 11; Jun. 4, 2012, pp. 6211-6220.
Loic Baggetto et al. "Probing the Mechanism of Sodium Ion Insertion into Copper Antimony cu 2 SB Anodes" Journal of Physical Chemistry C, vol. 118, No. 15; Apr. 17, 2014.
Veronica Palomares et al. "Update on Na-based battery materials. A growing research path", Energy and Environmental Science vol. 6; pp. 2312-2337; Jun. 14, 2013.
M. Bianchini et al: "Na 3 V 2 (P0 4) 2 F 3 Revisited: A High Resolution Diffraction Study", Chemistry of Materials, vol. 26, No. 14, Jul. 22, 2014; pp. 4238-4247.
Search report dated Mar. 1, 2016.
Search report dated Sep. 5, 2016.

\* cited by examiner

| \multicolumn{7}{|c|}{Space Group *A m a m*} |
|---|---|---|---|---|---|---|

| Space Group *A m a m* | | | | | | |
|---|---|---|---|---|---|---|
| $a = 9.2208(2)$ Å, $b = 9.2641(2)$ Å, $c = 10.6036(2)$ Å | | | | | | |
| $V = 905.79(3)$ Å$^3$ | | | | | | |
| Atom | Wyckoff site | x | y | z | B(Å$^2$) | Occupation |
| V1 | 8g | 1/4 | 0.2425(5) | 0.19037(10) | 0.66(4) | 1 |
| P | 8e | 0 | 0 | 0.2606(4) | -0.15(4) | 1 |
| O1 | 16h | 0.0880(7) | 0.0703(7) | 0.1519(4) | 0.05(7) | 1 |
| O2 | 16h | 0.1031(8) | 0.3963(7) | 0.1730(4) | 0.05(7) | 1 |
| F1 | 4c | 1/4 | 0.2605(18) | 0.00000 | 0.28(6) | 1 |
| F2 | 8g | 1/4 | 0.7552(14) | 0.1201(2) | 0.28(6) | 1 |
| Na1 | 4c | 1/4 | -0.0141(15) | 0 | 1.05(6) | 1 |
| Na2 | 8f | 0.5174(9) | 0.2564(11) | 0 | 1.05(6) | 1 |
| Na4 | 4c | 1/4 | 0.5089(16) | 0 | 1.05(6) | 1 |

Reliability parameters: Bragg R-factor= 2.91 %; $\chi^2$= 1.46

METHOD TO SYNTHESIZE NA-BASED ELECTROACTIVE MATERIALS

RELATED APPLICATION

This application is a National Phase of PCT/EP2016/063770, filed on Jun. 15, 2016 which in turn claims the benefit of priority from European Patent Application No. 15 305 956.3, filed on Jun. 19, 2015 and European Patent Application No. 15 306 674.1, filed on Oct. 19, 2015, the entirety of which are incorporated by reference.

FIELD OF THE INVENTION

The invention relates to a process for the preparation of sodium-based solid compounds, such as sodium-based solid alloys and sodium-based crystalline phases by ball-milling using metallic sodium as starting material.

DESCRIPTION OF RELATED ART

Sodium is a chemical element with symbol Na and atomic number 11. It is a soft, silver-white, highly reactive metal and is a member of the alkali metals; its only stable isotope is Na. The free metal does not occur in nature, but instead must be prepared from its compounds. Sodium is the sixth most abundant element in the Earth's crust, and exists in numerous minerals such as feldspars, sodalite and rock salt (NaCl). Many salts of sodium are highly water-soluble. Sodium ions have been leached by the action of water so that sodium and chlorine (Cl) are the most common dissolved elements by weight in the Earth's bodies of oceanic water.

Many sodium compounds are useful, such as sodium hydroxide (lye) for soap-making, and sodium chloride for use as a de-icing agent and a nutrient (edible salt), sodium alloys such as sodium phosphide ($Na_3P$) as a source of the highly reactive phosphide anion for example, $Na_3Sb$ as photoemissive materials for photocathodes in light detection devices, or sodium-based solid phases such as for example Na-based electrode materials ($NaFeMnO_2$, $NaFePO_4$, $Na_{0.6}Fe_{0.5}Mn_{0.5}O_2$, $Na_2FePO_4F$, $Na_3V_2(PO_4)_3F_3$, $Na_2Ti_3O_7$, $Na_2Fe(SO_4)_3$, $NaFeSO_4F$ etc. . . . ).

These compounds can usually be prepared by different methods including solvothermal route, high temperature annealing and electrochemically sodiation.

In the case of $Na_3P$, many different routes have been described. Due to its flammability and toxicity, $Na_3P$ (and related salts) are generally prepared in situ. It has already been proposed to reduce white phosphorus by sodium-potassium alloy to give sodium (Becker G. et al., *Inorganic Syntheses* 1990, 27: 243-249). The conversion of white phosphorus to the phosphide has been well studied. Phosphorus reacts with sodium in an autoclave at 150° C. for 5 hours to produce $Na_3P$ according to the following reaction (Xie Y. et al., *Mater. Res. Bull.,* 2000, 35 (5): 675-680):

$$P_4 + 12Na \rightarrow 4Na_3P$$

Alternatively the reaction can be conducted at normal pressures but using a temperatures gradient to generate nonvolatile $Na_xP$ phases (x<3) that then react further with sodium (Jarvis, R. F et al., *Inorg. Chem.,* 2000, 39 (15): 3243-3246).

In the case of $Na_3Sb$, many routes have also been proposed. As an example, it has recently been proposed to prepare $Na_3Sb$ inside an Ar-filled glovebox by adding stoichiometric amounts of metallic sodium and Sb in an Al foil crucible placed inside a Pyrex® tube. Using a Swagelok® fitting connected to a vacuum valve, a primary vacuum is created inside the tube and then the tube is placed in an oven at a temperature of 175° C. for several hours until Na melts to then react with Sb to form a solid compound. The recovered powder is then ground thoroughly, pressed into pellet and further annealed at 175° C. This procedure has then to be repeated to ensure the homogeneity of the compound (Baggetto L. et al., *J. Phys. Chem.,* 2014, 118, 7856-7864). However this method is long to perform (several hours) and cannot be implemented at room temperature.

Na-based solid phases can also be prepared by different routes such as, in the case of $Na_{2/3}[FeMn]_{1/2}O_2$ as an example, solid state reaction from stoichiometric amounts of the following oxides $Na_2O_3$, $Fe_2O_3$ and $Mn_2O_2$ in the requested specific molar ratio. The mixture of the sample is ground using a mortar and pestle and then pressed into pellets before being heated at 900° C. for several hours (Yabuuchi N. et al., Nature Materials, 2012, 11, 512-517).

Incidentally, it is also known to prepare Li-based negative electrode material by a ball-milling process, for example from Li powders with either CoO or CoSb. However, this process requires the presence of a solvent selected from the group of hydrocarbon family, such as dodecane, to avoid sticky Li deposition on the grinding via vials.

OBJECTS AND SUMMARY

The aim of the present invention is to provide a method for the preparation of Na-based solid alloys or Na-based solid phases not exhibiting the drawbacks of the prior art methods, in particular a method that could be fast and carried out at room temperature, with not need of any solvent and without involving complex devices.

This aim is reached by the process that will be described hereafter and that constitute the first object of the present invention.

In a surprising and totally counter intuitive manner, the Inventors have now found that it is possible to use a ball-milling process for preparation Na-based solid alloys and Na-Based solid phases starting from metallic Na without adding any solvent. Na metal is one of the most difficult metal to handle because sticking to metallic tweezers, spatulas and so on, hence the reason why Na ball-milling has never been practiced.

The first object of the present invention is a process for the preparation of Na-based solid alloys or of Na-based crystalline phases selected in the group consisting of Na-based crystalline P' 2-phases, Na-based solid crystalline phases of formula $Na_{(3+y)}V_2(PO_4)_3$ with $0<y\leq3$ and Na-based solid crystalline phases of formula $Na_{(3+z)}V_2(PO_4)_2F_3$ with $0<z\leq3$, said process comprising at least one step of ball-milling metallic sodium with a stoichiometric amount of a powder of at least one alloying solid element (X), or of at least one solid Na-based crystalline phase selected in the group consisting of solid Na-based crystalline P2-phases, $Na_3V_2(PO_4)_3$ and $Na_3V_2(PO_4)_2F_3$ respectively, said step of ball-milling being carried out in dry atmosphere and without heating.

Without willing to be bound by any theory, the inventors of the present invention think that the particles of the alloying element or of the Na-based solid crystalline phase react with sodium at the surface of the of metallic sodium used as bulk and form a thin layer of Na-based solid alloy or of the expected Na-based crystalline phase respectively, said thin layer being then immediately peeled-off/fractured by the action of balls in the mill while new particles of the alloying element or of the solid Na-based crystalline phase to be sodiated react with fresh metallic sodium surface generating a new thin layer of Na-based solid alloy or of the expected Na-based crystalline phase respectively, and so on. By way of this mechanism, any sticking of metallic sodium onto the balls of the mill is avoided and therefore it is possible to prepare Na-based solid alloys or Na-based crystalline phases by a process comprising a step a ball-milling starting from metallic sodium as bulk, without adding any solvent.

According to the present invention, the expression "Na-based solid alloy" refers to alloys comprising Na and at least one alloying element (X) selected from the group consisting of P, Sn, Sb, Pb, and C.

Among these elements, P, Sb and C are preferred.

The corresponding and preferred alloys are $Na_3P$, $Na_3Sb$, $Na_{15}Sn_4$, $Na_{15}Pb_4$, and $Na_xC$ with $0.01 < x < 0.2$.

According to a particulate embodiment of the present invention, and when the process is used to prepare Na-based solid alloys in which the alloying element (X) is different from carbon, such as $Na_3P$ or $Na_3Sb$ as examples, the ball-milling step can be performed in the presence of said allowing element X and further in the presence of carbon powder to lead to a $Na_3X/C$ composite in which particles of an alloy $Na_3X$ are produced and simultaneously embedded in a carbon matrix.

In that case, carbon powder can be added at any time during the ball-milling step. The amount of carbon powder can vary from about 5 to 50 weight % with regard to the total amount of solid materials (powders of the allowing element (s) and metallic sodium) contained in the ball-miller, and more preferably from about 10 to 30 weight %.

According to the present invention, the expression "Na-based solid crystalline P'2-phase" refers to P2 type layered crystalline Na-phases comprising Na and at least one oxide of at least one element selected from the group consisting of Fe, Mn, Co, Ni, P, S, Mn, V, Ti, and in which the amount of sodium per formula after the ball-milling process has been increased with regard to the amount of sodium initially present in the corresponding P2-phase. As an example, $NaFe_{0.5}Mn_{0.5}O_2$ is the P'2-phase corresponding to the P2-phase $Na_{0.67}Fe_{0.5}Mn_{0.5}O_2$.

Therefore, starting P2-phases are preferably selected from the group consisting of $Na_{0.67}Fe_{0.5}Mn_{0.5}O_2$, $Na_{0.67}MnO_2$, $Na_{0.74}CoO_2$, $Na_{0.67}Co_{0.67}Mn_{0.31}O_2$, $Na_{0.67}Ni_{1/3}Mn_{2/3}O_2$ and lead respectively, after the ball-milling step with metallic sodium according to the process of the present invention, to the following corresponding P'2-phases $NaFe_{0.5}Mn_{0.5}O_2$, $NaMnO_2$, $NaCoO_2$, $NaCo_{0.67}Mn_{0.33}O_2$, and $NaNi_{1/3}Mn_{2/3}O_2$.

According to a particulate and preferred embodiment of the present invention, the process is used to prepare:
  i) $NaFe_{0.5}Mn_{0.5}O_2$ and the ball milling step is carried out with metallic sodium and powder of $Na_{0.67}Fe_{0.5}Mn_{0.5}O_2$; or
  ii) $Na_{(3+y)}V_2(PO_4)_3$ with $0<y\leq3$, preferably $y=1$, and the ball milling step is carried out with metallic sodium and powder of $Na_3V_2(PO_4)_3$; or
  iii) $Na_{(3+z)}V_2(PO_4)_2F_3$ with $0<z\leq3$, preferably $z=1$, (such as in particular $Na_4V_2(PO_4)_2F_3$), and the ball milling step is carried out with metallic sodium and powder of $Na_3V_2(PO_4)_2F_3$.

Within the meaning of the present invention, the expression "dry atmosphere" means that the atmosphere is anhydrous or moisture-free. Preferably the atmosphere contains less than 20 ppm of water.

Preferably the step of ball-milling is carried out in an inert gas atmosphere, such as argon or nitrogen, and more preferably in a glove box filled with said inert gas. According to a particulate embodiment of the present invention, argon is preferred.

Within the meaning of the present invention, the terms "without heating" mean that the method is implemented without any external source of heating. In other terms, it is possible that the ball-milling step involves a heating (or temporary heating) of the reactants during said ball-milling step, for example due to friction or exothermic reactions. However, said heating is inherent to said ball-milling step and not to an external source of heating.

The step of ball-milling is preferably performed at a temperature ranging from 20 to 300° C., and more preferably between 25 to 80° C.

According to a preferred embodiment of the present invention, the ball-milling step is carried in a hard steel ball-miller jar containing a weight of milling-balls ($W_{mb}$) such as the weight ratio $W_{mb}/W_s$, with $W_s$ being the total weight of solid materials contained in the jar (metallic Na as bulk and powder(s)) of the allowing element(s) or of crystalline Na-based solid P2-phase(s)), ranges from about 10 to 60, preferably from 20 to 60 and more preferably from about 30 to 50 or from 20 to 40.

The volume of solid materials into the ball-miller is preferably ⅓ lower than the volume of the ball-miller jar.

The process according to the invention can be carried out in a ball-miller operating by vibrating movements of the balls in the three spatial directions or in a ball-miller operating by centrifuging movements of the balls.

As an example of ball-miller operating by vibrating movements of the balls, one can mention the ball-miller sold under the reference 8000M by Spex® comprising a metallic jar having an intern volume of 30 cm³ and a vibration frequency set at 875 cycles/minute (clamp speed).

As an example of ball-miller operating by centrifuging movements of the balls (planetary ball-miller), one can mention the ball-miller sold under the reference PM 100 by Retsch. This ball-miller operates at a speed ratio of 1/(−1) and a rotation speed up to 1000 rotations per minute (rpm). In this type of ball-miller, grinding is essentially carried out thanks to the balls that crush the powders and solids against the inner wall of the jar. Grinding is therefore essentially carried out by pressure and friction. The combination of impact forces and friction forces ensures a very high and efficient degree of grinding of planetary ball-millers.

When the ball-milling step of the process of the invention is performed in a ball-miller operating by centrifuging movements of the balls, the rotation speed is preferably set at a value ranging from about 200 and 1000 rpm, and more preferably from about 400 and 650 rpm.

The duration of the ball-milling step may vary depending on the rotation speed set for the ball-miller and on the amount solid materials to grind. In order to avoid a temperature rise, the ball-milling step can be performed in several grinding sequences, said sequences being separated by breaks allowing the decrease of the temperature inside the jar. As an example, when a Spex® 8000M or Retsch PM 100 ball miller is used, the ball-milling step can be carried out according to a sequence of alternating series of 30 minutes of grinding and 15 minutes of break.

In said ball-millers, the effective duration of the ball-milling step (not including breaking times) can vary from about 0.1 to 50 hours, preferably from about 1 to 50 hours, more preferably from about 2 to 10 hours or from about 0.2 to 5 hours.

The molar ratios of metallic sodium/Na-based crystalline P2-phases, metallic sodium/$Na_3V_2(PO_4)_3$ or metallic sodium/$Na_3V_2(PO_4)_2F_3$ can vary from about 0.1 to about 3.

Depending on that molar ratios, the process leads respectively to a Na-based crystalline P'2-phases, a Na-based solid crystalline phases of formula $Na_{(3+y)}V_2(PO_4)_3$ with $0<y\leq3$, preferably y=1 or to a Na-based solid crystalline phases of formula $Na_{(3+z)}V_2(PO_4)_2F_3$ with $0<z\leq3$, preferably z=1, wherein said phases can eventually be in admixture with the corresponding starting material which has not been totally consumed during the ball milling step (i.e. respectively a Na-based crystalline P2-phase, $Na_3V_2(PO_4)_3$ or $Na_3V_2(PO_4)_2F_3$).

As an example, and according to one embodiment of the invention, the molar ratio metallic sodium/$Na_3V_2(PO_4)_2F_3$ is less than 1. Thus, the process leads to a composite material comprising $Na_4V_2(PO_4)_2F_3$ and $Na_3V_2(PO_4)_2F_3$ (starting material which has not been totally consumed during the ball milling step).

Molar ratios of about 0.25 and about 0.5 are preferred and lead respectively to a composite material comprising 0.75 mole of $Na_3V_2(PO_4)_2F_3$ and 0.25 mole of $Na_4V_2(PO_4)_2F_3$, and to a composite material comprising 0.5 mole of $Na_3V_2(PO_4)_2F_3$ and 0.5 mole of $Na_4V_2(PO_4)_2F_3$.

In another example, and according to another embodiment of the invention, the molar ratio metallic sodium/$Na_3V_2(PO_4)_2F_3$ is greater than 1. Thus, the process essentially leads to the solid crystalline phase of formula $Na_4V_2(PO_4)_2F_3$.

A molar ratio of about 2 is preferred. Indeed, with such a ratio of 2, the starting material $Na_3V_2(PO_4)_2F_3$ can be totally consumed during the ball milling step and the process leads to $Na_4V_2(PO_4)_2F_3$ only.

It is noted that duration of the ball-milling step can also influence the respective proportions of $Na_3V_2(PO_4)_2F_3$ and $Na_4V_2(PO_4)_2F_3$ in the final compound.

As an example, a ball-milling duration of at least 3 hours is usually employed to obtain the pure solid crystalline phase of formula $Na_4V_2(PO_4)_2F_3$.

By contrast, ball-milling durations of less than 1 hour usually lead to a composite material comprising $Na_4V_2(PO_4)_2F_3$ and $Na_3V_2(PO_4)_2F_3$.

Na-based solid alloys, Na-based solid crystalline phases (optionally in the form of a composite with the corresponding starting material) obtained at the end of the process can be used immediately or stored, preferably under an inert atmosphere.

Na-based solid alloys and Na-based solid crystalline phases obtained according to the process according to the present invention can be used different fields of industries, and in particular in the fields of Na-ion batteries.

Some of the Na-based solid crystalline phases obtained by the process defined according to the first object of the present invention (optionally in admixture with the corresponding starting material which has not been totally consumed during the ball milling step) have never been isolated in the form of a solid powder before and therefore constitute a second object of the present invention.

A second object of the present invention is therefore Na-based solid crystalline phases directly obtained in powder form by the process defined as the first object of the present invention, and selected in the group consisting of $NaMnO_2$, $NaCoO_2$, $NaCo_{0.67}Mn_{0.33}O_2$, $NaNi_{1/3}Mn_{2/3}O_2$, $Na_{(3+y)}V_2(PO_4)_3$ with $0<y\leq3$ (preferably y=1), and $Na_{(3+z)}V_2(PO_4)_2F_3$ with $0<z\leq3$ (preferably z=1). Among $Na_{(3+z)}V_2(PO_4)_2F_3$ with $0<z\leq3$ phases, mention can in particular be made of $Na_4V_2(PO_4)_2F_3$.

A third object of the present invention is a composite material comprising $Na_3V_2(PO_4)_2F_3$, wherein it further comprises a Na-based solid crystalline phase of formula $Na_4V_2(PO_4)_2F_3$ obtainable in powder form by the process defined as the first object of the present invention.

Indeed, the inventors have surprisingly found that a composite material comprising $Na_3V_2(PO_4)_2F_3$ and $Na_4V_2(PO_4)_2F_3$ (as an intimate mixture) displays a higher energy density than $Na_3V_2(PO_4)_2F_3$ thanks to the presence of the Na-rich solid crystalline phase $Na_4V_2(PO_4)_2F_3$ which provides sacrificial Na to compensate for the SEI formation (Solid Electrolyte Interface) at the negative electrode.

$Na_3V_2(PO_4)_2F_3$ can be separately obtained by traditional solid state reactions or obtained in powder mixture with $Na_4V_2(PO_4)_2F_3$ solid crystalline phase by the process defined as the first object of the present invention.

In a preferred embodiment, said composite material comprises 0.75 mole of $Na_3V_2(PO_4)_2F_3$ and 0.25 mole of $Na_4V_2(PO_4)_2F_3$, or 0.5 mole of $Na_3V_2(PO_4)_2F_3$ and 0.5 mole of $Na_4V_2(PO_4)_2F_3$.

The Na-based solid crystalline phases and the composite material comprising $Na_3V_2(PO_4)_2F_3$ and $Na_4V_2(PO_4)_2F_3$ directly obtainable in powder form by the process defined as the first object of the present invention are useful as active material for the positive electrode in batteries operating by circulation of sodium ions.

A fourth object of the present invention is therefore the use of at least one Na-based solid crystalline phase selected in the group consisting of $NaMnO_2$, $NaCoO_2$, $NaCo_{0.67}Mn_{0.33}O_2$, $NaNi_{1/3}Mn_{2/3}O_2$, $Na_{(3+y)}V_2(PO_4)_3$ with $0<y\leq3$, in particular with y=1, and $Na_{(3+z)}V_2(PO_4)_2F_3$ with $0<z\leq3$), in particular $Na_4V_2(PO_4)_2F_3$, or of a composite material comprising $Na_3V_2(PO_4)_2F_3$ and $Na_4V_2(PO_4)_2F_3$, obtainable as powdered form by the process defined in the first object of the present invention, as active material for the positive electrode in a battery operating by circulation of sodium ions (Na-ion battery).

A fifth object of the present invention is a positive electrode for a Na-ion battery composed of an electrode active material and a current collector, wherein said electrode active material is a Na-based solid crystalline phase selected in the group consisting of $NaMnO_2$, $NaCoO_2$, $NaCo_{0.67}Mn_{0.31}O_2$, $NaNi_{1/3}Mn_{2/3}O_2$, $Na_{(3+y)}V_2(PO_4)_3$ with $0<y\leq3$, in particular with y=1, and $Na_{(3+z)}V_2(PO_4)_2F_3$ with $0<z\leq3$), in particular $Na_4V_2(PO_4)_2F_3$, or of a composite material comprising $Na_3V_2(PO_4)_2F_3$ and $Na_4V_2(PO_4)_2F_3$, said Na-based solid crystalline phase and said composite material being obtainable according to the process defined by the first object of the present invention.

In a preferred embodiment of the present invention, the amount of said Na-based solid crystalline phase or of said composite material varies from 60 to 100 w %, and more preferably from 80 to 95 w % with regard to the total amount of the electrode material.

In addition to the Na-based solid crystalline phase or to the composite material comprising the Na-based solid crystalline phase of formula $Na_4V_2(PO_4)_2F_3$, the electrode material may comprise one or more binders conferring mechanical strength to the electrode material.

The binder is preferably a polymer which has a high modulus of elasticity (e.g. of the order of several hundred MPa), and which is stable under the temperature and voltage conditions in which the positive electrode is intended to operate. The binder maintains adhesion of the positive electrode material to the current collector, maintain ionic contact, and facilitate the formation of a stable interface with the electrolyte.

The binder may be selected from fluoropolymers such as poly(vinylidene fluoride) (PVDF) or poly(tetrafluoroethylene), cellulose fibers, cellulose derivatives such as starch, carboxymethyl cellulose (CMC), diacetyl cellulose hydroxyethyl cellulose or hydroxypropyl cellulose, styrene butadiene rubber (SBR) and a mixture thereof.

The amount of binder may vary from 0 to 40 w %, preferably, from 3 to 10 w % with regard to the total weight of the positive electrode material.

In addition to the Na-based solid crystalline phase or to the composite material comprising the Na-based solid crystalline phase of formula $Na_4V_2(PO_4)_2F_3$, the electrode material may also comprise at least one electronically conductive agent. The conductive agent may be carbon black, Super P carbon black, acetylene black, ketjen black, channel black, natural or synthetic graphite, carbon fibers, carbon nanotubes, vapor grown carbon fibers or a mixture thereof.

The amount of electronically conductive agent may vary from 0 to 40 w %, preferably, from 5 to 15 w % with regard to the total weight of the positive electrode material.

The current collector may be composed of a conductive material, more particularly of a metallic material which may be selected from aluminium, steel and iron.

A sixth object of the present invention is a battery using sodium ions as electrochemical vector (Na-ion battery), said battery comprising:
  at least one positive electrode,
  at least one negative electrode,
  said positive and negative electrodes being separated by an electrolyte comprising at least one sodium salt,
  wherein the positive electrode is as defined in the fifth object of the present invention.

The active material used for the negative electrode can be a selected among any negative active materials having large irreversible capacities such as carbon materials, in particular carbon nanofibers or carbon felt, which may also act as current collector.

According to a preferred embodiment of the present invention, the active material of the negative electrode is a carbon material.

The electrolyte of the Na-ion battery according to the invention is generally a solution comprising a salt of sodium and a solvent.

The solvent may be a liquid solvent, optionally gelled by a polymer, or a polar polymer solvent which is optionally plasticized by a liquid.

The proportion of liquid solvent in the solvent may vary from about 2% by volume (corresponding to a plasticized solvent) to about 98% by volume (corresponding to a gelled solvent).

The sodium salt is preferably selected from the group consisting of $NaClO_4$, $NaBF_4$, $NaPF_6$, $Na_2SO_4$, $NaNO_3$, $Na_3PO_4$, $Na_2CO_3$, sodium salts having a perfluoroalkanesulfonate anion, sodium bis(perfluoroalkanesulfonyl)methane, sodium tris(perfluoroalkanesulfonyl)methane and sodium bis(perfluoroalkanesulfonyl)imide (e.g. NaTFSI, also known under the chemical name sodium bis(trifluoromethanesulfonyl)imide).

The liquid solvent may be composed of at least one polar aprotic solvent selected from cyclic and linear carbonates (e.g. ethylene carbonate, propylene carbonate, butylene carbonate, dimethyl carbonate, diethyl carbonate, dipropyl carbonate, ethyl methyl carbonate, vinylene carbonate, fluoroethylene carbonate), esters, nitriles (e.g. acetonitrile, benzonitrile), nitro derivatives (nitromethane, nitrobenzene), amides (e.g. dimethylformamide, diethylformamide, N-methylpyrrolidone), sulfones (e.g. dimethylsulfone, tetramethylene sulfone), sulfolanes, alkylsulfamides (tetraalkylsulfonamides having from 5 to 10 carbon atoms), partially hydrogenated hydrocarbons, cyclic and linear ethers (e.g. diethyl ether, tetrahydrofuran, dimethoxyethane, dioxane, glyme, dimethyltetrahydrofuran, methyl), polyethylene glycol ethers (e.g. $RO(CH_2CH_2O)_nR'$ in which R and R' are $CH_3$ or $C_2H_5$ and $1 \leq n \leq 12$), tetraalkyl sulfamides (e.g. $RR'NSO_2NR''R'''$ in which R, R', R", and R'" are $CH_3$ or $C_2H_5$), 3-methyl-1,3-oxazolidin-2-one, and cyclic esters (e.g. γ-butyrolactone).

Said liquid solvent may optionally be gelled by addition of a polymer obtained, for example, from one or more monomers selected from ethylene oxide, propylene oxide, methyl methacrylate, methyl acrylate, acrylonitrile, methacrylonitrile, N-vinylpyrrolidone and vinylidene fluoride, said polymer having a linear, comb, random, alternating, or block structure, and being crosslinked or not.

When the electrolyte is a liquid electrolyte, said liquid impregnates a separator. The separator may be a conventional polymer-based separator such as a Celgard® separator or a Whatman® borosilicate glass fiber separator.

In a preferred embodiment, the electrolyte is a solution comprising a salt of sodium and one or more carbonates selected from ethylene carbonate, propylene carbonate, dimethylcarbonate, vinylene carbonate, and fluoroethylene carbonate.

A Na-ion battery according to the invention may be composed of a single electrochemical cell comprising two electrodes (i.e. one positive electrode and one negative electrode) separated by an electrolyte; or of a plurality of chemical cells assembled in series; or of a plurality of chemical cells assembled in parallel; or of a combination of the two assembly types.

DETAILED DESCRIPTION

The present invention is illustrated in more detail in the examples below, but it is not limited to said examples.

Powder purity and crystallinity were examined by X-ray diffraction (XRD), with a Bruker D8 Advance diffractometer operating in Bragg-Brentano geometry with a Cu Kα radiation and equipped with a power spectral density detector.

Example 1

Preparation of $Na_3P$ by Ball-Milling

In this example, $Na_3P$ has been prepared.

Stoichiometric amounts of metallic sodium as bulk (1.38 g, Sigma) and red phosphorus (0.62 g, Alfa, 325 mesh) were filled into a hard steel ball-milled jar of a Spex® 8000M ball-miller (30 $cm^3$) in an Ar-filled glove box and equipped with seven hard steel balls each having a weight of 7 g and a diameter of 12 mm. These solid materials were ball milled for 2-10 h to obtain $Na_3P$ particles.

Figure 1:
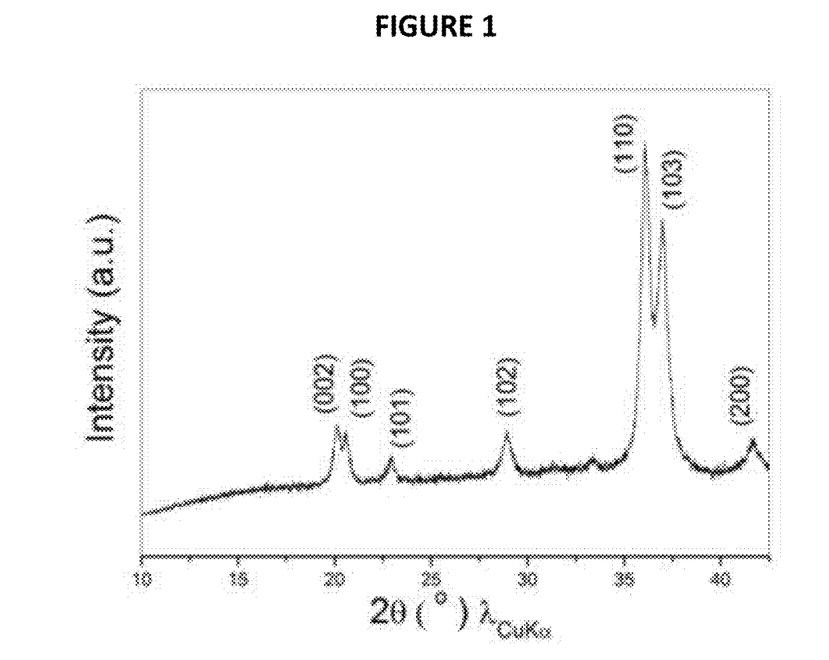
FIG. 1 is an XRD pattern from Example 1.

The XRD pattern of the composite thus obtained is shown in FIG. 1 annexed (intensity (in arbitrary units) is a function of angle 2θ (in degrees)). It indicates that a pure phase of $Na_3P$ is successfully produced without any other intermediate phase.

Example 2

Preparation of $Na_3Sb$ by Ball-Milling

In this example, $Na_3Sb$ has been prepared.

The preparation of $Na_3Sb$ was basically the same as that of $Na_3P$, only replacing P with Sb (Alfa, 325 mesh). 0.69 g of metallic sodium as bulk and 1.22 g of Sb was filled into the same ball-milled jar and ball milled for 2-10 h to produce $Na_3Sb$.

Example 3

Preparation of $Na_{15}Sn_4$ by Ball-Milling

In this example, $Na_{15}Sn_4$ has been prepared.

The preparation of $Na_{15}Sn_4$ was basically the same as that of $Na_3P$ only replacing P with Sn. 0.83 g of metallic sodium as bulk and 1.17 g of Sn (Alfa, 325 mesh) was filled into the same ball-milled jar and ball milled for 2-10 h to produce $Na_{15}Sn_4$.

Example 4

Preparation of a $Na_3P/C$ Composite by Ball-Milling

In this example, a composite comprising $Na_3P$ alloy particles embedded in a carbon matrix has been prepared.

$Na_3P$ was synthesized through ball milling of metallic sodium (Sigma) and red phosphorus (Alfa, 325 mesh) using a Spex 8000M ball-miller Stoichiometric amounts of precursors (0.69 g of metallic sodium as bulk and 0.31 g of red phosphorus) were filled into a hard steel ball-milled jar (30 $cm^3$) in an Ar-filled glove box and equipped with five hard steel balls each having a weight of 7 g and a diameter of 12 mm.

The ball-to-powder weight ratio was maintained between 30-50 during the whole ball-milling step.

After 2 hours of ball-milling, 0.43 g of carbon black (30 wt. %) were added into the jar to produce $Na_3P/C$ composites with $Na_3P$ particles embedded in the carbon matrix.

Figure 2:
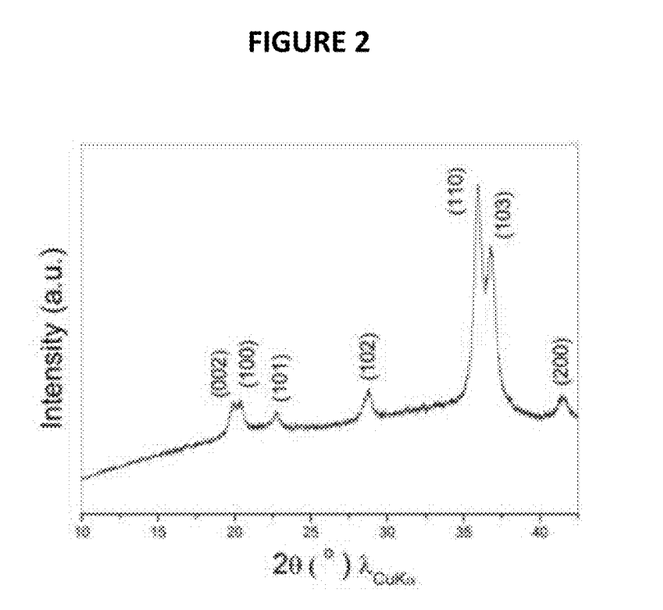
FIG. 2 is an XRD patterns of the $Na_3P/C$ composite from Example 4.

For achieving uniform distribution of $Na_3P$ in carbon, the ball milling was pursued for 10 h. The XRD patterns of the $Na_3P/C$ composite thus obtained is reported in FIG. 2 annexed (intensity (in arbitrary units) is a function of angle 2θ (in degrees)). The pattern given by FIG. 2 indicates that a pure phase of $Na_3P$ is successfully produced without any other intermediate phase.

Example 5

Preparation of a $Na_3Sb/C$ Composite by Ball-Milling

In this example, a composite comprising $Na_3Sb$ alloy particles embedded in a carbon matrix has been prepared.

The preparation of $Na_3Sb/C$ composite was basically the same as that of $Na_3P/C$ in example 4, only replacing P with 0.64 g of Sb (Alfa, 325 mesh). The amount of Na was changed to 0.36 g accordingly.

Figure 3:
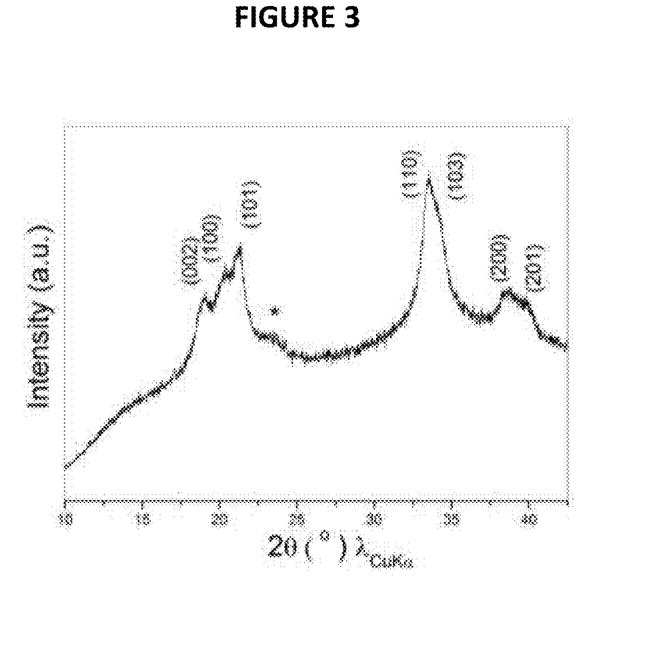
FIG. 3 is an XRD pattern of the composite from Example 5.

The XRD pattern of the composite thus obtained is shown in FIG. 3 annexed (intensity (in arbitrary units) is a function of angle 2θ (in degrees)). The pattern given by FIG. 3 proves the successful production of $Na_3Sb$ with minor impurity as indicated by a star, which may be because of the intermediate phase of $Na_xSb$ (x<3).

Example 6

Preparation of $Na_{15}Sn_4/C$ by Ball-Milling

In this example, a composite comprising $Na_{15}Sn_4$ alloy particles embedded in a carbon matrix has been prepared.

$Na_{15}Sn_4/C$ was synthesized through ball milling of metallic sodium (Sigma), Sn (Alfa, 325 mesh) and carbon black using Spex 8000M ball-miller Stoichiometric amounts of $Na_{15}Sn_4$ precursors (0.42 g of metallic sodium and 0.58 g of Sn) and 0.43 g of carbon black (30 wt %) were filled into a hard steel ball-milled jar (30 $cm^3$) in an Ar-filled glove box and equipped with six hard steel balls each having a weight of 7 g and a diameter of 12 mm.

Figure 4:
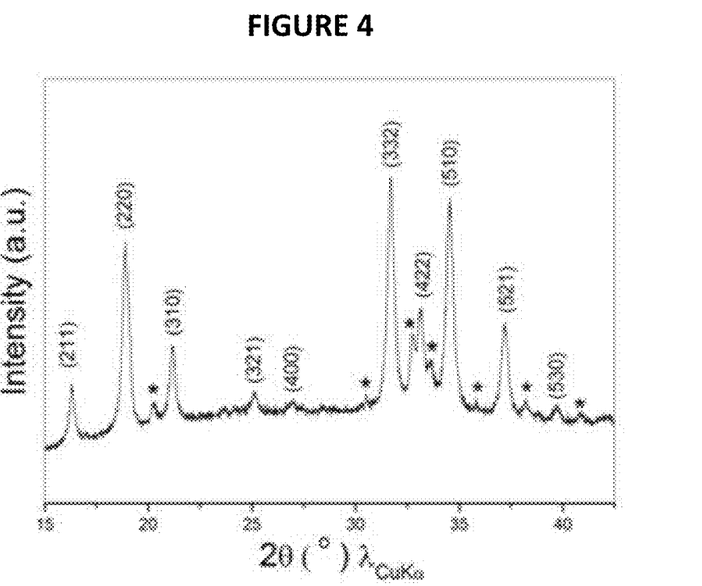
FIG. 4 is an XRD pattern of the composite from Example 6.

The XRD pattern of the composite thus obtained is shown in FIG. 4 annexed (intensity (in arbitrary units) is a function of angle 2θ (in degrees)). The pattern given by FIG. 4 proves the successful production of $Na_{15}Sn_4$ with minor impurity as indicated by a star, which may be because of the intermediate phase of $Na_xSn_4$ (x<15).

Example 7

Preparation of $Na[Fe_{1/2}Mn_{1/2}]O_2$ by Ball Milling

The P2 type phase $Na_{0.67}[FeMn]_{0.5}O_2$ (NFMO) was first prepared by traditional solid state reactions according to the method disclosed by Yabuuchi N. et al. (Nature Materials, 2012, 11, 512-517).

Stoichiometric amounts of metallic Na and $Na_{0.67}[FeMn]_{0.5}O_2$ were ball milled to make the P'2-phase $Na[Fe_{1/2} Mn_{1/2}]O_2$. 1.03 g of $Na_{0.67}[FeMn]_{0.5}O_2$ and 0.076 g of metallic Na were filled into a hard steel ball-milled jar (30 $cm^3$) (Spex® 8000M) in an Ar-filled glove box and equipped with five hard steel balls each having a weight of 7 g and a diameter of 12 mm. The corresponding P'2-phase $Na[Fe_{1/2}Mn_{1/2}]O_2$ started to appear after 20 min of ball milling. To fully transfer P2 into P'2, it is possible to longer time ball milling to 2 h or add excess amount of metallic Na.

Figure 5A:
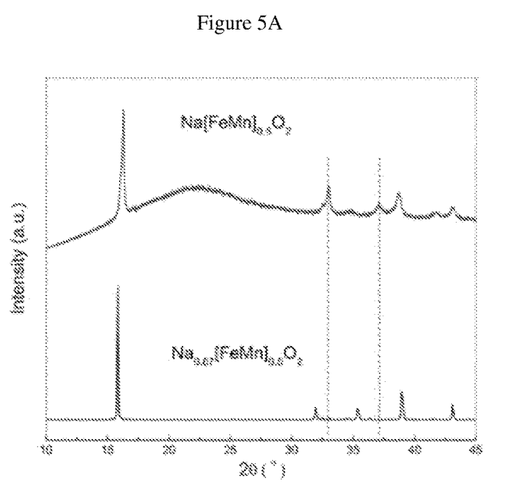
FIG. 5A is an XRD patterns of the P'2-phase from Example 7.
Figure 5B:
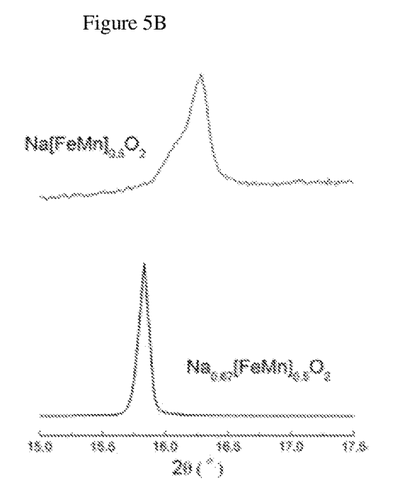
FIG. 5B is a detailed view of FIG. 5a between 15 and 17.5 degrees.

The XRD patterns of the P'2-phase $Na[Fe_{1/2}Mn_{1/2}]O_2$ thus obtained and of initial P2 phase $Na_{0.67}[FeMn]_{0.5}O_2$ are given in FIG. 5a annexed (intensity (in arbitrary units) is a function of angle 2θ (in degrees)). FIG. 5b is a detailed view of FIG. 5a between 15 and 17.5 degrees. FIG. 5a and FIG.

5b confirm the successful production of Na[Fe$_{1/2}$Mn$_{1/2}$]O$_2$, in which a shift of (002) peak from 15.8 to 16.3° was observed in addition to the appearance of two peaks at 33 and 37°.

Example 8

Preparation of Na$_4$V$_2$(PO$_4$)$_2$F$_3$ by Ball Milling

Na$_3$V$_2$(PO$_4$)$_2$F$_3$ was first prepared by traditional solid state reactions according to the method disclosed by L. Croguennec et al. (Chemistry of Materials, 2014, 26, 4238-4247).

Na$_3$V$_2$(PO$_4$)$_2$F$_3$ were ball milled with an excess molar amount of metallic Na (2Na per Na$_3$V$_2$(PO$_4$)$_2$F$_3$) to make Na$_4$V$_2$(PO$_4$)$_2$F$_3$. 1.0 g of Na$_3$V$_2$(PO$_4$)$_2$F$_3$ and 0.11 g of metallic Na were filled into a hard steel ball-milled jar (30 cm$^3$) (Spex® 8000M) in an Ar-filled glove box and equipped with four hard steel balls, each having a weight of 7 g and a diameter of 12 mm Na$_4$V$_2$(PO$_4$)$_2$F$_3$ was obtained after 3 h of ball milling.

Figure 6:
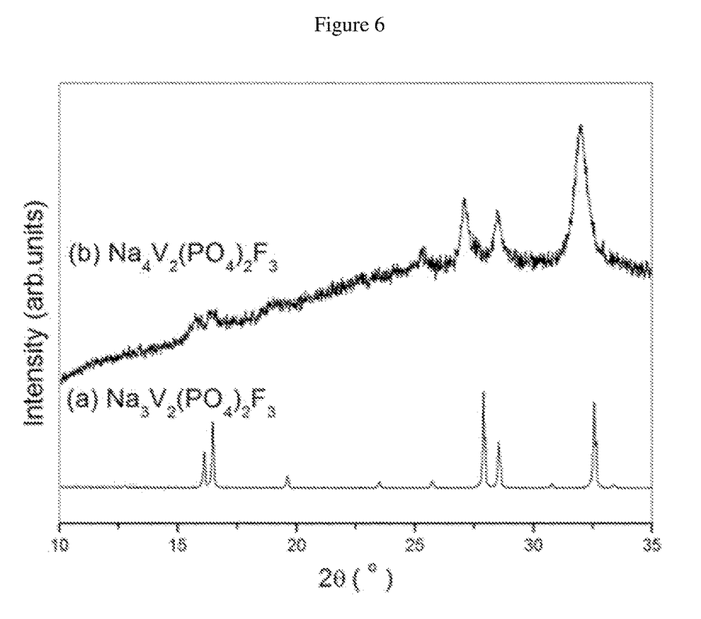
FIG. 6 is an XRD patterns of $Na_4V_2(PO_4)_2F_3$ from Example 8.
Figure 7:
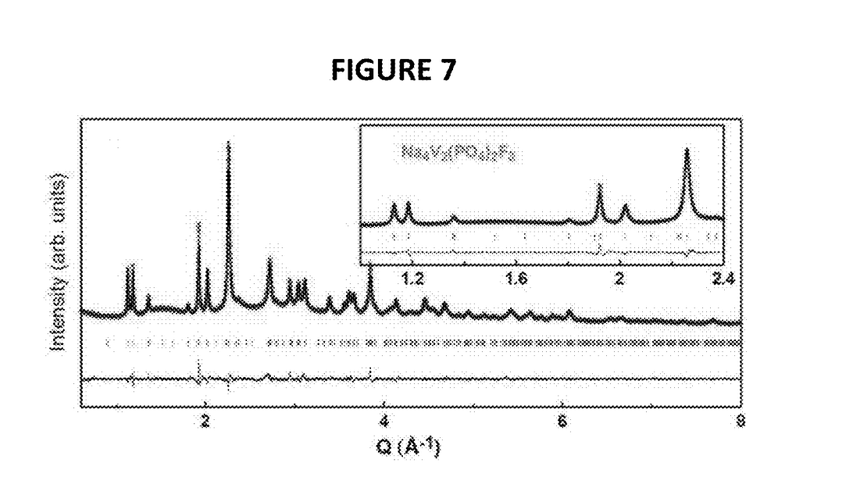
FIG. 7 is a synchrotron XRD pattern of pure $Na_4V_2(PO_4)_2F_3$ from Example 8.
Figure 8:
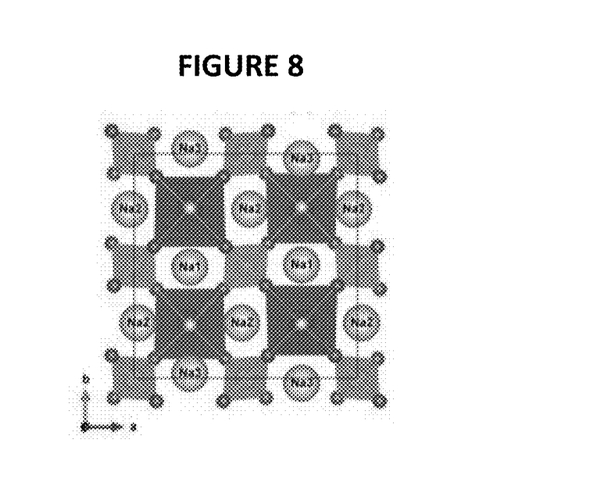
FIG. 8 is a corresponding crystal structure from FIG. 7.
Figure 9:
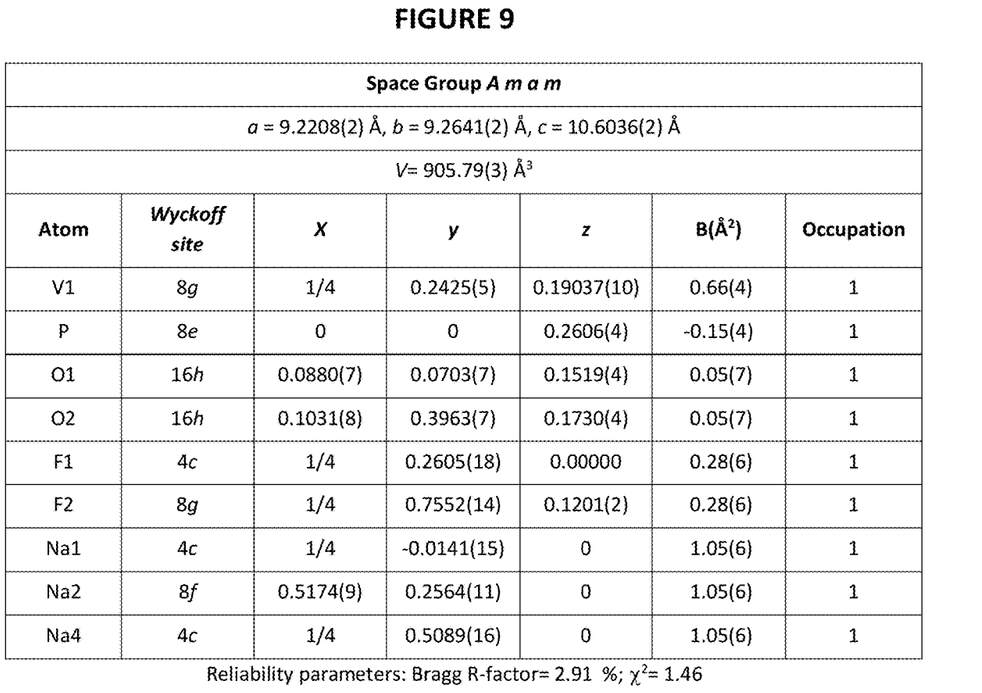
FIG. 9 is a table of a structural parameters of $Na_4V_2(PO_4)_2F_3$ deduced from the combined Rietveld refinement of the X-Ray diffraction patterns in Example 8.

The XRD patterns of Na$_4$V$_2$(PO$_4$)$_2$F$_3$ thus obtained and of initial Na$_3$V$_2$(PO$_4$)$_2$F$_3$ are given in FIG. 6 annexed [intensity (in arbitrary units) as a function of angle 2θ (in degrees)]. The synchrotron XRD pattern of pure Na$_4$V$_2$(PO$_4$)$_2$F$_3$ is shown in FIG. 7 with corresponding crystal structure shown in FIG. 8. VO$_4$F$_2$ octahedral and PO$_4$ tetrahedral are colored in dark grey and light-grey, respectively. Na atoms are shown as light-grey balls. Structural parameters of Na$_4$V$_2$(PO$_4$)$_2$F$_3$ deduced from the combined Rietveld refinement of the X-Ray diffraction pattern are given in FIG. 9.

More particularly, the material of formula Na$_4$V$_2$(PO$_4$)$_2$F$_3$ is composed of particles of a fluorophosphate that crystallizes in the Amam space group.

The Synchrotron X-ray diffraction patterns of the pure Na$_4$V$_2$(PO$_4$)$_2$F$_3$ phase measured at ESRF on ID22 with λ=0.3543 Å shows that the diffraction peaks can be indexed in the same orthorhombic cell as for the pristine Na$_3$V$_2$(PO$_4$)$_2$F$_3$, but with different lattice parameters, i.e. a=9.2208(2) Å, b=9.2641(2) Å, c=10.6036(2) Å.

Example 9

Preparation of a Composite Material 1 Comprising 0.5 Mole of Na$_4$V$_2$(PO$_4$)$_2$F$_3$ and 0.5 Mole of Na$_3$V$_2$(PO$_4$)$_2$F$_3$ by Ball-Milling Na$_3$V$_2$(PO$_4$)$_2$F$_3$ was prepared according to Example 8.

Na$_3$V$_2$(PO$_4$)$_2$F$_3$ was ball milled with a stoichiometric amount of Na (0.5Na per Na$_3$V$_2$(PO$_4$)$_2$F$_3$) to make a composite material 1 comprising Na$_4$V$_2$(PO$_4$)$_2$F$_3$ and Na$_3$V$_2$(PO$_4$)$_2$F$_3$. 1.0 g of Na$_3$V$_2$(PO$_4$)$_2$F$_3$ and 0.0275 g of metallic Na were filled into a hard steel ball-milled jar (30 cm$^3$) (Spex® 8000M) in an Ar-filled glove box and equipped with four hard steel balls, each having a weight of 7 g and a diameter of 12 mm. A composite material 1 comprising 0.5 mole of Na$_4$V$_2$(PO$_4$)$_2$F$_3$ and 0.5 mole of Na$_3$V$_2$(PO$_4$)$_2$F$_3$ was obtained after 0.5 h of ball milling.

Figure 10:
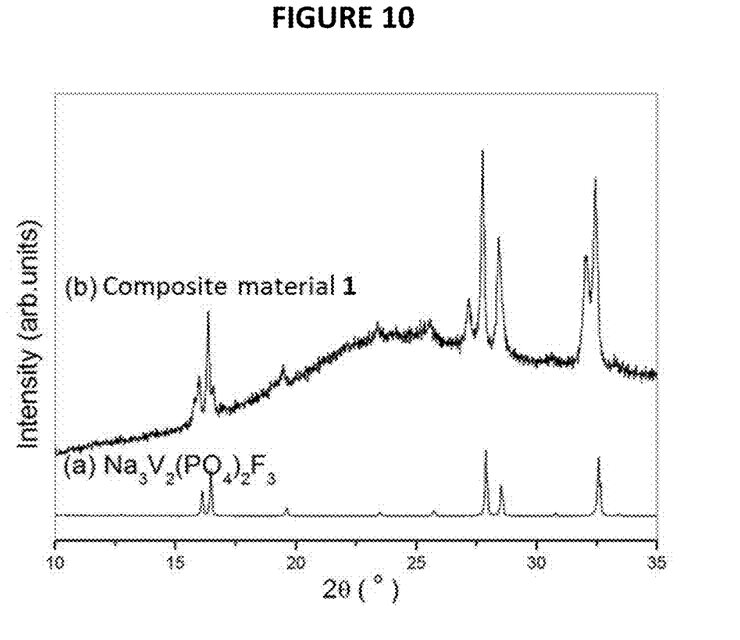
FIG. 10 is an XRD patterns of the composite material from Example 9.

The XRD patterns of the composite material 1 thus obtained and of initial Na$_3$V$_2$(PO$_4$)$_2$F$_3$ are given in FIG. 10 annexed [intensity (in arbitrary units) as a function of angle 2θ (in degrees)].

Figure 11:
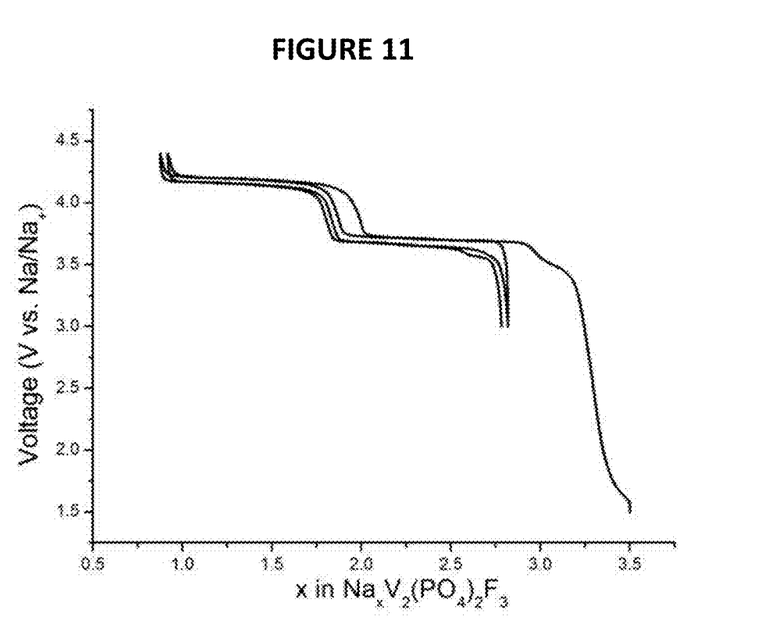
FIG. 11 is a charge/discharge curve in the 1st and 2nd cycle from Example 9.

The composite material 1 was used as a positive electrode in a coin cell to evaluate the electrochemical performance. A Na foil was used as the counter electrode, with 1M NaClO$_4$ in EC/DMC (1:1 by volume) as the liquid electrolyte and glass fiber (Whatman®, GF/D) as the separator. The cells were tested in a VMP system (Biologic S.A., Claix, France). The charge/discharge curve in the 1st and 2nd cycle is shown in FIG. 11 annexed [Voltage (V) as a function of x in Na$_x$V$_2$(PO$_4$)$_2$F$_3$]. The Na that extracted from first plateau at about 1.5V corresponds to the transformation of the composite material 1 to Na$_3$V$_2$(PO$_4$)$_2$F$_3$.

Example 10

Preparation of a Composite Material 2 Comprising 0.25 Mole of Na$_4$V$_2$(PO$_4$)$_2$F$_3$ and 0.75 Mole of Na$_3$V$_2$(PO$_4$)$_2$F$_3$ by Ball-Milling Na$_3$V$_2$(PO$_4$)$_2$F$_3$ was prepared according to Example 8.

Na$_3$V$_2$(PO$_4$)$_2$F$_3$ was ball milled with a stoichiometric amount of Na (0.25Na per Na$_3$V$_2$(PO$_4$)$_2$F$_3$) to make a composite material 2 comprising Na$_4$V$_2$(PO$_4$)$_2$F$_3$ and Na$_3$V$_2$(PO$_4$)$_2$F$_3$. 1.0 g of Na$_3$V$_2$(PO$_4$)$_2$F$_3$ and 0.0138 g of metallic Na were filled into a hard steel ball-milled jar (30 cm$^3$) (Spex® 8000M) in an Ar-filled glove box and equipped with four hard steel balls, each having a weight of 7 g and a diameter of 12 mm A composite material 2 comprising 0.25 mole of Na$_4$V$_2$(PO$_4$)$_2$F$_3$ and 0.75 mole of Na$_3$V$_2$(PO$_4$)$_2$F$_3$ was obtained after 0.5 h of ball milling.

Figure 12:
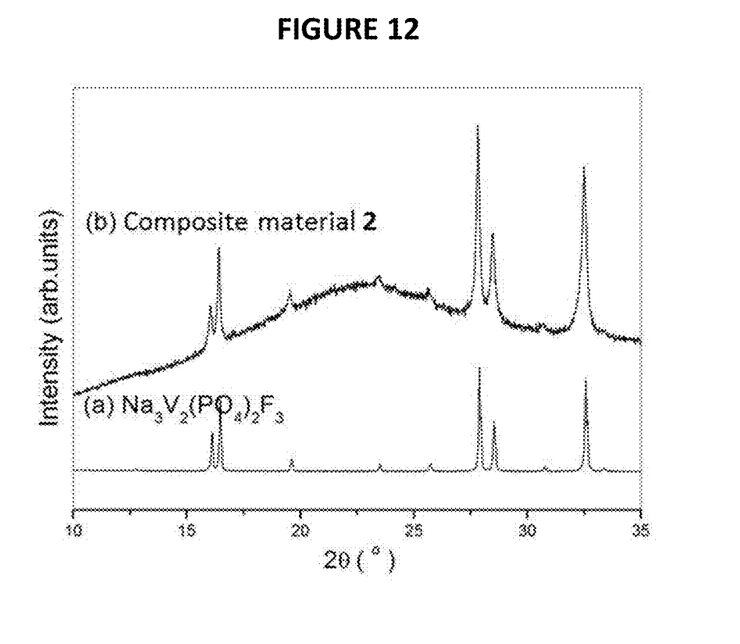
FIG. 12 is XRD patterns of the composite material from Example 10.

The XRD patterns of the composite material 2 thus obtained and of initial Na$_3$V$_2$(PO$_4$)$_2$F$_3$ are given in FIG. 12 annexed [intensity (in arbitrary units) as a function of angle 2θ (in degrees)].

Figure 13:
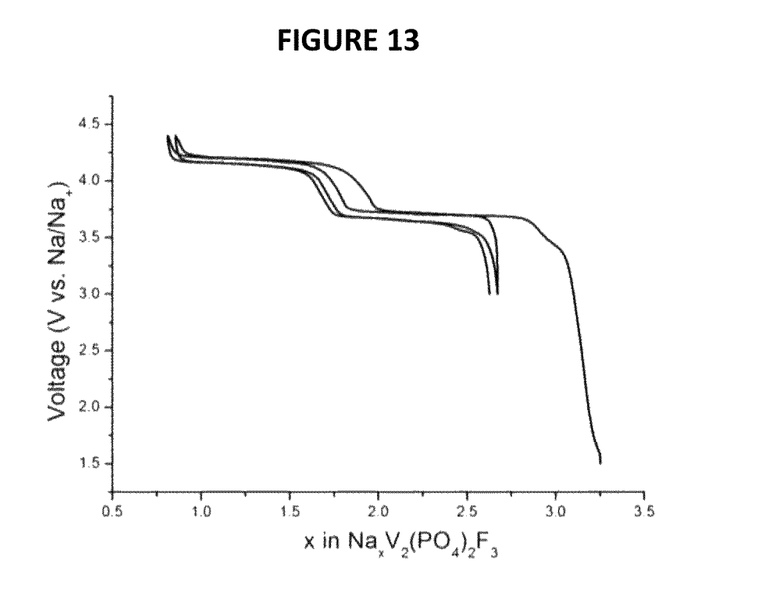
FIG. 13 is a charge/discharge curve in the 1st and 2nd cycles from Example 10.

The electrochemical performance of the composite material 2 thus obtained was tested in a Na cell identical to the one used in example 9 with the composite material and Na metal as working and counter electrodes, respectively. The charge/discharge curve in the 1st and 2nd cycles is shown in FIG. 13 annexed [Voltage (V) as a function of x in Na$_x$V$_2$(PO$_4$)$_2$F$_3$]. The Na that extracted from first plateau at about 1.5V corresponds to the transformation of the composite material 2 to Na$_3$V$_2$(PO$_4$)$_2$F$_3$.

Example 11

Preparation of a Full Cell with the Composite Material 1 Prepared According to Example 9 as Positive Electrode Material In this example, the composite material 1 prepared according to example 9, has been used as a positive electrode active material to assemble a Na-ion battery comprising hard carbon as a negative electrode and 1M NaClO$_4$ in EC/DMC (1:1 by volume) as a liquid electrolyte.

1) Preparation of Hard Carbon Anode

Hard carbon was produced by pyrolysis of glucose according to the method disclosed by J. R. Dahn et al. (Journal of the Electrochemical Society, 2000, 147, 1271)

2) Assembly of the Na-Ion Battery

Hard carbon and the composite material 1 prepared according to the method given in example 9, were used as anode and cathode, respectively, in a coin cell to evaluate the electrochemical performances of Na-ion batteries. A Na foil was used as the counter electrode, with 1M NaClO$_4$ in EC/DMC (1:1 by volume) as the electrolyte and glass fiber (Whatman®, GF/D) as the separator. The cell was tested in a VMP system (Biologic S.A., Claix, France).

For comparison purpose, a comparative Na-ion battery not forming part of the present invention has also been prepared using the Na$_3$V$_2$(PO$_4$)$_2$F$_3$ solid crystalline phase as positive electrode active material instead of the composite material of example 9.

3) Cycling Performances

Each battery was sealed and then a reducing current corresponding to a rate of 0.2 C was applied. The capacity was calculated based on the weight of the positive electrode.

Figure 14:
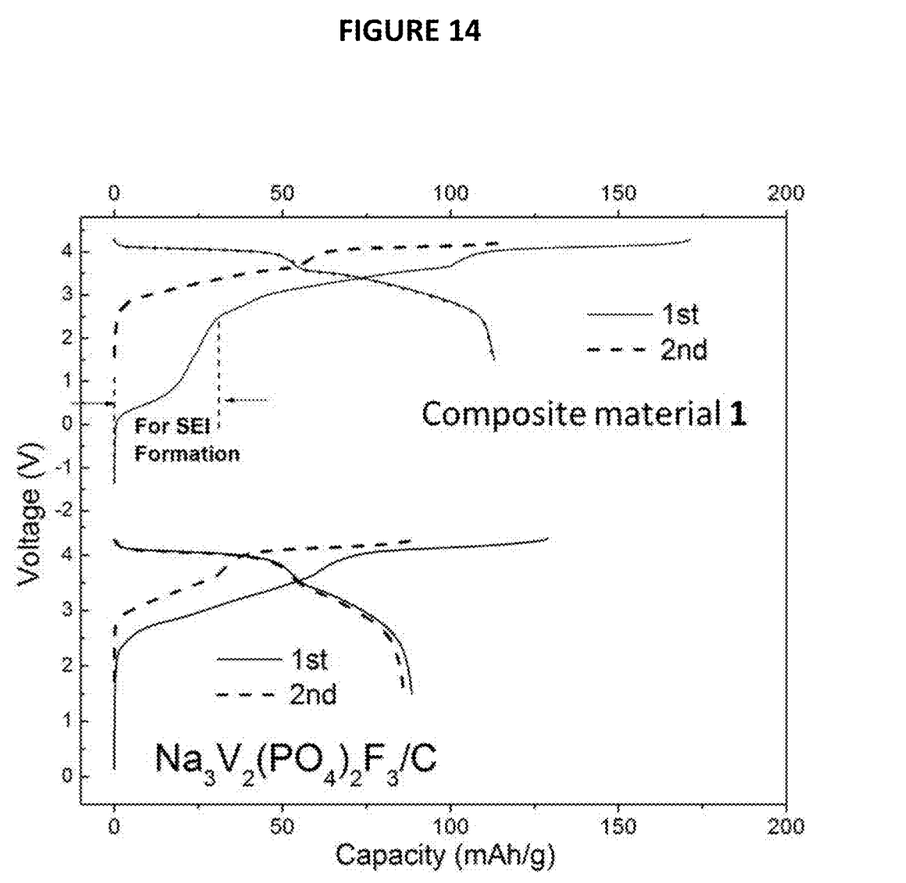
FIG. 14 is a table for the voltage (in V) as a function of capacity (in mAh/g) from Example 11.

For each Na-ion battery, the cycling performances were studied. They are reported on FIG. 14 annexed on which the voltage (in V) is a function of capacity (in mAh/g). These results show that there is large irreversible capacity in the first cycle for the battery comprising only $Na_3V_2(PO_4)_2F_3$ as positive electrode active material (battery not forming part of the present invention) and a coulombic efficiency of about 70% in the 1st cycle. The majority capacity loss is attributed to the SEI formation on the carbon electrode which consumed Na. For the battery according to the invention, i.e. comprising the composite material 1, the results show a capacity increased from 89 to 110 mAh/g, thus demonstrating that the use of such a composite material 1 makes it possible to fight against irreversible is capacity in Na-ion batteries.

The invention claimed is:

1. Process for the preparation of Na-based solid alloys or of Na-based crystalline phases selected in the group consisting of Na-based crystalline P'2-phases, Na-based solid crystalline phases of formula $Na_{(3+y)}V_2(PO_4)_3$ with $0<y\leq 3$ and Na-based solid crystalline phases of formula $Na_{(3+z)}V_2(PO_4)_2F_3$ with $0<z\leq 3$, said process comprising at least one step of ball-milling metallic sodium with a stoichiometric amount of a powder of at least one alloying solid element (X), or of at least one solid Na-based crystalline phase selected in the group consisting of solid Na-based crystalline P2-phases, $Na_3V_2(PO_4)_3$ and $Na_3V_2(PO_4)_2F_3$ respectively, said step of ball-milling being carried out in a dry atmosphere and without heating.

2. The process according to claim 1, wherein the at least one alloying element is selected from the group consisting of P, Sn, Sb, Pb, and C.

3. The process according to claim 1, for the preparation of $Na_3P$, $Na_3Sb$, $Na_{15}Sn_4$, $Na_{15}Pb_4$, and $Na_xC$ with $0.01<x<0.2$.

4. The process according to claim 1, wherein Na-based solid crystalline P'2-phases are selected from the group consisting of P2 type layered crystalline Na-phases comprising Na and at least one oxide of at least one element selected from the group consisting of Fe, Mn, Co, Ni, P, S, Mn, V, Ti, and in which the amount of sodium per formula after the ball-milling process has been increased with regard to the amount of sodium initially present in the P2-phase.

5. The process according to claim 1 or, for the preparation of $NaFe_{0.5}Mn_{0.5}O_2$, $NaMnO_2$, $NaCoO_2$, $NaCo_{0.67}Mn_{0.33}O_2$, $NaNi_{1/3}Mn_{2/3}O_2$.

6. The process according to claim 1, for the preparation of:
   i) $NaFe_{0.5}Mn_{0.5}O_2$, and the ball milling step is carried out with metallic sodium and powder of $Na_{0.67}Fe_{0.5}Mn_{0.5}O_2$; or
   ii) $Na_{(3+y)}V_2(PO_4)_3$ with $0<y\leq 3$ and the ball milling step is carried out with metallic sodium and powder of $Na_3V_2(PO_4)_3$; or
   iii) $Na_{(3+z)}V_2(PO_4)_2F_3$ with $0<z\leq 3$ and the ball milling step is carried out with metallic sodium and powder of $Na_3V_2(PO_4)_2F_3$.

7. The process according to claim 1, wherein the step of ball-milling is carried out in a glove box filled with an inert gas.

8. The process according to claim 1, wherein the step of ball-milling is performed at a temperature ranging from 25 to 80° C.

9. The process according to claim 1, wherein the ball-milling step is carried out in a hard steel ball-miller jar containing a weight of milling-balls ($W_{mb}$) such as the weight ratio $W_{mb}/W_S$, with $W_S$ being the total weight of solid materials contained in the jar, ranges from about 10 to 60.

10. The process according to claim 1, wherein the ball milling step is carried out in a ball-miller operating by centrifuging movements of the balls at a rotation speed set at a value ranging from 200 and 1000 rotations per minute.

11. The process according to claim 1, wherein the effective duration of the ball-milling step varies from 0.1 to 50 hours.

12. The process according to claim 1, for the preparation of Na-based solid alloys in which the alloying element (X) is different from carbon, wherein the ball-milling step is performed in the presence said alloying element and further in the presence of carbon powder, said process leading to a $Na_3X/C$ composite in which particles of an alloy $Na_3X$ are embedded in a carbon matrix.

13. The process according to claim 12, wherein, the amount of carbon powder varies from 5 to 50 weight % with regard to the total amount of solid materials contained in the ball-miller.

14. The process according to claim 1, wherein molar ratios of metallic sodium/Na-based crystalline P2-phases, metallic sodium/$Na_3V_2(PO_4)_3$ or metallic sodium/$Na_3V_2(PO_4)_2F_3$ vary from about 0.1 to about 2.

* * * * *